United States Patent
Hu et al.

(10) Patent No.: US 12,273,240 B2
(45) Date of Patent: Apr. 8, 2025

(54) METHOD AND APPARATUS FOR ISOLATION SUPPORT IN NETWORK SLICING

(71) Applicant: Nokia Solutions and Networks Oy, Espoo (FI)

(72) Inventors: Zhiyuan Hu, Shanghai (CN); Jing Ping, Sichuan (CN); Iris Adam, Munich (DE); Duan Chen, Shanghai (CN); Zhigang Luo, Shanghai (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 222 days.

(21) Appl. No.: 18/004,926

(22) PCT Filed: Jul. 15, 2020

(86) PCT No.: PCT/CN2020/102006
§ 371 (c)(1),
(2) Date: Jan. 10, 2023

(87) PCT Pub. No.: WO2022/011578
PCT Pub. Date: Jan. 20, 2022

(65) Prior Publication Data
US 2023/0362057 A1    Nov. 9, 2023

(51) Int. Cl.
*H04L 41/0894* (2022.01)
*H04L 41/0895* (2022.01)
(Continued)

(52) U.S. Cl.
CPC ...... *H04L 41/0894* (2022.05); *H04L 41/0895* (2022.05); *H04L 41/0897* (2022.05);
(Continued)

(58) Field of Classification Search
CPC ............. H04L 41/0894; H04L 41/0897; H04L 41/0895; H04L 43/20; H04L 43/06; H04L 43/0876; H04W 24/02
(Continued)

(56) References Cited

U.S. PATENT DOCUMENTS 10,616,934 B2    4/2020    Talebi Fard et al.
2019/0021010 A1    1/2019    Senarath et al.
(Continued)

FOREIGN PATENT DOCUMENTS

CN    109417572 A    3/2019
CN    109429244 A    3/2019
(Continued)

OTHER PUBLICATIONS

Nokia, et al. "TD proposal for network slice isolation attribute" 3GPP TSG-SA5 Meeting #129e S5-201382, Feb. 14, 2020 (Feb. 14, 2020).
(Continued)

*Primary Examiner* — Nicholas R Taylor
*Assistant Examiner* — Chong G Kim
(74) *Attorney, Agent, or Firm* — Robert P. Michal, Esq.; Carter, DeLuca & Farrell LLP

(57) ABSTRACT

An example method may include receiving slice isolation policy for a network slice subnet (NSS) in a transport network (TN) domain, mapping the slice isolation policy to network resource isolation policy and traffic isolation policy, and mapping the network resource isolation policy and the traffic isolation policy to network resource allocation policy
(Continued)

and data traffic forward policy, respectively. The network resource allocation policy and the data traffic forward policy may be applied in creation of the TN NSS.

1 Claim, 13 Drawing Sheets

(51) Int. Cl.
*H04L 41/0897* (2022.01)
*H04L 43/06* (2022.01)
*H04L 43/0876* (2022.01)
*H04L 43/20* (2022.01)
*H04W 24/02* (2009.01)

(52) U.S. Cl.
CPC .......... *H04L 43/06* (2013.01); *H04L 43/0876* (2013.01); *H04L 43/20* (2022.05); *H04W 24/02* (2013.01)

(58) Field of Classification Search
USPC .......................................................... 370/254
See application file for complete search history.

(56) References Cited

U.S. PATENT DOCUMENTS

| | | | |
|---|---|---|---|
| 2020/0059407 A1* | 2/2020 | Lu | ........................ H04L 41/0896 |
| 2020/0177460 A1 | 6/2020 | Xu et al. | |
| 2020/0228405 A1* | 7/2020 | Fang | .................... H04L 41/0843 |
| 2020/0329381 A1* | 10/2020 | Chou | .................... H04W 24/02 |
| 2021/0119879 A1* | 4/2021 | Zhang | .................... H04L 41/122 |
| 2022/0217005 A1* | 7/2022 | Zhu | ...................... H04L 12/1407 |
| 2023/0045460 A1* | 2/2023 | Ho | ......................... H04W 48/18 |

FOREIGN PATENT DOCUMENTS

| | | |
|---|---|---|
| CN | 110661636 A | 1/2020 |
| EP | 3579505 A1 | 12/2019 |
| WO | WO-2018054220 A1 | 3/2018 |
| WO | WO-2021/159461 A1 | 8/2021 |
| WO | WO-2021/174439 A1 | 9/2021 |
| WO | WO-2021/223103 A1 | 11/2021 |

OTHER PUBLICATIONS

International Search Report for International Application No. PCT/CN2020/102006 dated Apr. 19, 2021.
Danilo Gligoroski et al., "Expanded Combinatorial Designs as Tool to Model Network Slicing in 5G," IEEE Access, vol. 7, Published Apr. 25, 2019, pp. 1-9.
J. Babiarz et al., "Configuration Guidelines for DiffServ Service Classes," Nortel Networks, Cisco Systems, Aug. 2006, pp. 1-57.
GSM Association, "Official Document NG.116—Generic Network Slice Template", Version 1.0, May 23, 2019, pp. 1-60.

\* cited by examiner

METHOD AND APPARATUS FOR ISOLATION SUPPORT IN NETWORK SLICING

CROSS-REFERENCE TO RELATED APPLICATIONS

This application is a national phase under 35 U.S.C. § 371 of PCT International Application No. PCT/CN2020/102006 which has an International filing date of Jul. 15, 2020, the entire contents of each of which are hereby incorporated by reference.

TECHNICAL FIELD

Various example embodiments described herein generally relate to communication technologies, and more particularly, to communication methods and apparatus supporting fine-grained isolation policy in network slicing.

BACKGROUND

Certain abbreviations that may be found in the description and/or in the figures are herewith defined as follows:
ACL Access Control List
AN Access Network
CN Core Network
DSCP Differentiated Services Code Point
E2E End to End
NF Network Function
NFV Network Function Virtualization
NR New Radio
NS Network Slice
NSMF Network Slice Management Function
NSI Network Slice Instance
NSS Network Slice Subnet
NSSMF Network Slice Subnet Management Function
NSSI Network Slice Subnet Instance
NRM Network Resource Model
SDN Software Defined Networking
SMF Session Management Function
TN Transport Network
VLAN Virtual Local Area Network
UPF User Plane Function 5G NR is designed for a wide range of usage scenarios typically including for example enhanced Mobile Broad Band (eMBB), massive Machine Type Communication (mMTC) and ultra Reliable and Low Latency Communication (uRLLC). Many usage scenarios require different types of features and networks in terms of mobility, security, policy control, latency, coverage, reliability and the like. Therefore, network slicing has been proposed to slice one physical network into multiple virtual E2E networks to carry different types of services with different characteristics and requirements. With network slicing, various services for different companies and industries may be provided by one physical network and consequently network utilization is greatly improved.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a method for isolation of a network slice is provided. The method may comprise receiving slice isolation policy for a network slice subnet (NSS) in a transport network (TN) domain, mapping the slice isolation policy to network resource isolation policy and traffic isolation policy, and mapping the network resource isolation policy and the traffic isolation policy to network resource allocation policy and data traffic forward policy, respectively. The network resource allocation policy and the data traffic forward policy may be applied in creation of the TN NSS.

In a second aspect, an example embodiment of a method for isolation of a network slice is provided. The method may comprise creating a data transport channel for a NSS in a TN complying with isolation policy for the TN NSS, collecting isolation relevant data of the TN NSS during operation of the TN NSS, and reporting the collected isolation relevant data to an isolation monitoring function at a higher layer.

In a third aspect, an example embodiment of a method for isolation of a network slice is provided. The method may comprise sending a request of collecting isolation monitoring data for a NSS to a transport control and management function of a TN, receiving the isolation monitoring data for the TN NSS from the transport control and management function, analyzing the isolation monitoring data to determine if slice isolation policy for the TN NSS is satisfied during operation of the TN NSS, and reporting the analysis result of the isolation monitoring data to an isolation monitoring function at a higher layer.

In a fourth aspect, an example embodiment of a method for isolation of a network slice is provided. The method may comprise receiving isolation monitoring information for a NSS of a NS, determining if slice isolation policy is properly enforced during operation of the NSS based on the received isolation monitoring information, the received isolation monitoring information comprising analysis results of isolation monitoring data with respect to attributes refined from the slice isolation policy, and generating an alarm when it is determined that at least a part of the slice isolation policy is not properly enforced.

In a fifth aspect, an example embodiment of a network function unit is provided. The network function unit may comprise at least one processor and at least one memory including computer program code. The at least one memory and the computer program code may be configured to, with the at least one processor, cause the network function unit to receive slice isolation policy for a NSS in a TN domain, map the slice isolation policy to network resource isolation policy and traffic isolation policy, and map the network resource isolation policy and the traffic isolation policy to network resource allocation policy and data traffic forward policy, respectively. The network resource allocation policy and the data traffic forward policy may be applied in creation of the TN NSS.

In a sixth aspect, an example embodiment of a network function unit is provided. The network function unit may comprise at least one processor and at least one memory including computer program code. The at least one memory and the computer program code may be configured to, with the at least one processor, cause the network function unit to create a data transport channel for a NSS in a TN complying with isolation policy for the TN NSS, collect isolation relevant data of the TN NSS during operation of the TN NSS, and report the collected isolation relevant data to an isolation monitoring function at a higher layer.

In a seventh aspect, an example embodiment of a network function unit for monitoring isolation of a network slice is provided. The network function unit may comprise at least one processor and at least one memory including computer program code. The at least one memory and the computer program code may be configured to, with the at least one processor, cause the network function unit to send a request of collecting isolation monitoring data for a NSS to a transport control and management function of a TN, receive the isolation monitoring data for the TN NSS from the transport control and management function, analyze the isolation monitoring data to determine if slice isolation policy for the TN NSS is satisfied during operation of the TN NSS, and report the analysis result of the isolation monitoring data to an isolation monitoring function at a higher layer.

In an eighth aspect, an example embodiment of a network function unit is provided. The network function unit may comprise at least one processor and at least one memory including computer program code. The at least one memory and the computer program code may be configured to, with the at least one processor, cause the network function unit to receive isolation monitoring information for a NSS of a NS, determine if slice isolation policy is properly enforced during operation of the NSS based on the received isolation monitoring information, the received isolation monitoring information comprising analysis results of isolation monitoring data with respect to attributes refined from the slice isolation policy, and generate an alarm when it is determined that at least a part of the slice isolation policy is not properly enforced.

In a ninth aspect, an example embodiment of an apparatus for isolation of a network slice is provided. The apparatus for isolation of a network slice may comprise means for receiving slice isolation policy for a NSS in a TN domain, means for mapping the slice isolation policy to network resource isolation policy and traffic isolation policy, and means for mapping the network resource isolation policy and the traffic isolation policy to network resource allocation policy and data traffic forward policy, respectively. The network resource allocation policy and the data traffic forward policy may be applied in creation of the TN NSS.

In a tenth aspect, an example embodiment of an apparatus for isolation of a network slice is provided. The apparatus for isolation of a network slice may comprise means for creating a data transport channel for a NSS in a TN complying with isolation policy for the TN NSS, means for collecting isolation relevant data of the TN NSS during operation of the TN NSS, and means for reporting the collected isolation relevant data to an isolation monitoring function at a higher layer.

In an eleventh aspect, an example embodiment of an apparatus for monitoring isolation of a network slice is provided. The apparatus for monitoring isolation of a network slice may comprise means for sending a request of collecting isolation monitoring data for a NSS to a transport control and management function of a TN, means for receiving the isolation monitoring data for the TN NSS from the transport control and management function, means for analyzing the isolation monitoring data to determine if slice isolation policy for the TN NSS is satisfied during operation of the TN NSS, and means for reporting the analysis result of the isolation monitoring data to an isolation monitoring function at a higher layer.

In a twelfth aspect, an example embodiment of an apparatus for monitoring isolation of a network slice is provided. The apparatus for monitoring isolation of a network slice may comprise means for receiving isolation monitoring information for a NSS of a NS, means for determining if slice isolation policy is properly enforced during operation of the NSS based on the received isolation monitoring information, and means for generating an alarm when it is determined that at least a part of the slice isolation policy is not properly enforced. The received isolation monitoring information may comprise analysis results of isolation monitoring data with respect to attributes refined from the slice isolation policy.

In a thirteenth aspect, an example embodiment of a computer readable medium is provided. The computer readable medium may have instructions stored thereon. The instructions, when executed by at least one processor of a network function unit, may cause the network function unit to receive slice isolation policy for a NSS in a TN domain, map the slice isolation policy to network resource isolation policy and traffic isolation policy, and map the network resource isolation policy and the traffic isolation policy to network resource allocation policy and data traffic forward policy, respectively. The network resource allocation policy and the data traffic forward policy may be applied in creation of the TN NSS.

In a fourteenth aspect, an example embodiment of a computer readable medium is provided. The computer readable medium may have instructions stored thereon. The instructions, when executed by at least one processor of a network function unit, may cause the network function unit to create a data transport channel for a NSS in a TN complying with isolation policy for the TN NSS, collect isolation relevant data of the TN NSS during operation of the TN NSS, and report the collected isolation relevant data to an isolation monitoring function at a higher layer.

In a fifteenth aspect, an example embodiment of a computer readable medium is provided. The computer readable medium may have instructions stored thereon. The instructions, when executed by at least one processor of a network function unit, may cause the network function unit to send a request of collecting isolation monitoring data for a NSS to a transport control and management function of a TN, receive the isolation monitoring data for the TN NSS from the transport control and management function, analyze the isolation monitoring data to determine if slice isolation policy for the TN NSS is satisfied during operation of the TN NSS, and report the analysis result of the isolation monitoring data to an isolation monitoring function at a higher layer.

In a sixteenth aspect, a computer readable medium is provided. The computer readable medium may have instructions stored thereon. The instructions, when executed by at least one processor of a network function unit, may cause the network function unit to receive isolation monitoring information for a NSS of a NS, determine if slice isolation policy is properly enforced during operation of the NSS based on the received isolation monitoring information, and generate an alarm when it is determined that at least a part of the slice isolation policy is not properly enforced. The received isolation monitoring information may comprise analysis results of isolation monitoring data with respect to attributes refined from the slice isolation policy.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

A network slice is a logical communication network that operates on top of a physical network, and multiple network slices operating on one physical network may share network resources. A challenge to network slicing is to ensure isolation between network slices because some tenants may need to run a sensitive service in a network slice that is isolated to some extent from other services. E2E network slicing spans across multiple parts of the network such as the access network (AN), the transport network (TN) and the core network (CN). Transport network slicing can be applied for connecting the access network to the core network, and also applied within the core network. For example, a transport network slice may connect an access network to a user plane function (UPF) in a core network, or connect a set of user plane functions to a session management function (SMF) in the core network. E2E slice isolation needs to be ensured in the access network, the transport network and the core network. Hereinafter, example embodiments of isolation for network slices will be described with reference to the transport network, but it would be appreciated that the isolation solutions provided by the transport network are also applicable to the access network and the core network.

Figure 1:
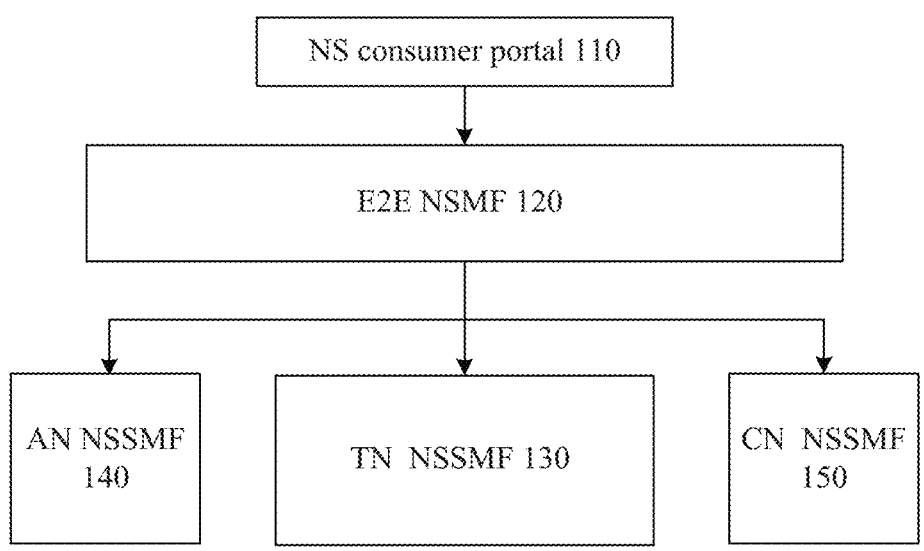
FIG. 1 illustrates architecture of network functions for E2E network slice management in which example embodiments of the present disclosure can be implemented.

FIG. 1 illustrates architecture of network functions for network slice management in which example embodiments of the present disclosure can be implemented. Referring to FIG. 1, a network slice consumer portal 110 is provided for the tenants to conduct control and management on the E2E network slices. For example, the network slice consumer portal 110 may receive from a tenant a request to create an E2E network slice along with a Service Level Agreement (SLA) or a service profile that specifies requirements such as bandwidth, rate, latency, connectivity, mobility or the like for services to be run on the network slice. If the SLA is received, it may be converted into the service profile. The network slice consumer portal 110 may forward the request to create a slice and the service profile to a network slice management function (NSMF) 120 for creation of the slice. The tenant may also for example monitor and re-configure network slices through the network slice consumer portal 110.

When the NSMF 120 receives the request to create a network slice and the service profile, it may create a network slice instance (NSI) according to the service profile. For example, the NSMF 120 may map the service profile to a slice profile and establish a network resource model (NRM) for the slice. The NSMF 120 may further break down the slice profile into domain slice profiles and call domain management functions to create domain NSSs based on respective domain slice profiles. For example, the NSMF 120 may call an AN network slice subnet management function (NSSMF) 140 to create an NSS instance in the AN domain, a TN NSSMF 130 to create an NSS instance in the TN domain, and a CN NSSMF 150 to create an NSS instance in the CN domain. It would be understood that the NSMF 120 may include a plurality of functions or sub-functions to create and manage network slice instances. For example, the NSMF 120 may include an NS orchestration function, an NS security function, an NS resource model function, an NS instance function, and the like. The functions or sub-functions of the NSMF 120 may be deployed as respective stand-alone network functions or deployed together at the same host device. It would also be understood that the domain NSSMFs 130, 140, 150 may include a plurality of functions or sub-functions to create and manage network slice subnet instances in their own domains. For example, the domain NSSMFs 130, 140, 150 each may include an NSS orchestration function, an NSS security function, an NSS resource model function, an NSS instance function, and the like. The functions or sub-functions of the domain NSSMFs 130, 140, 150 may be deployed as respective stand-alone network functions or deployed together at the same host device. The network functions or sub-functions, also referred to as network function units, may be implemented by using hardware or running software on hardware, or may be implemented in a form of virtual functions on a common hardware platform.

It has been recognized by the industries that isolation is an important requirement for the E2E network slices. Isolation refers to a degree of resource sharing that could be tolerated by the tenants, and the tenants may require different levels of isolation. For example, some tenants may not mind to share network resources with others, while some tenants may want to use dedicated physical or logic resources for all or a particular type of service data. Hereinafter, example embodiments of methods and apparatus for isolation support in network slicing will be discussed. In some example embodiments, fine-grained isolation policy is supported by the E2E network slice, thereby the network slice can satisfy demands of the tenants for various isolation requirements.

Figure 2:
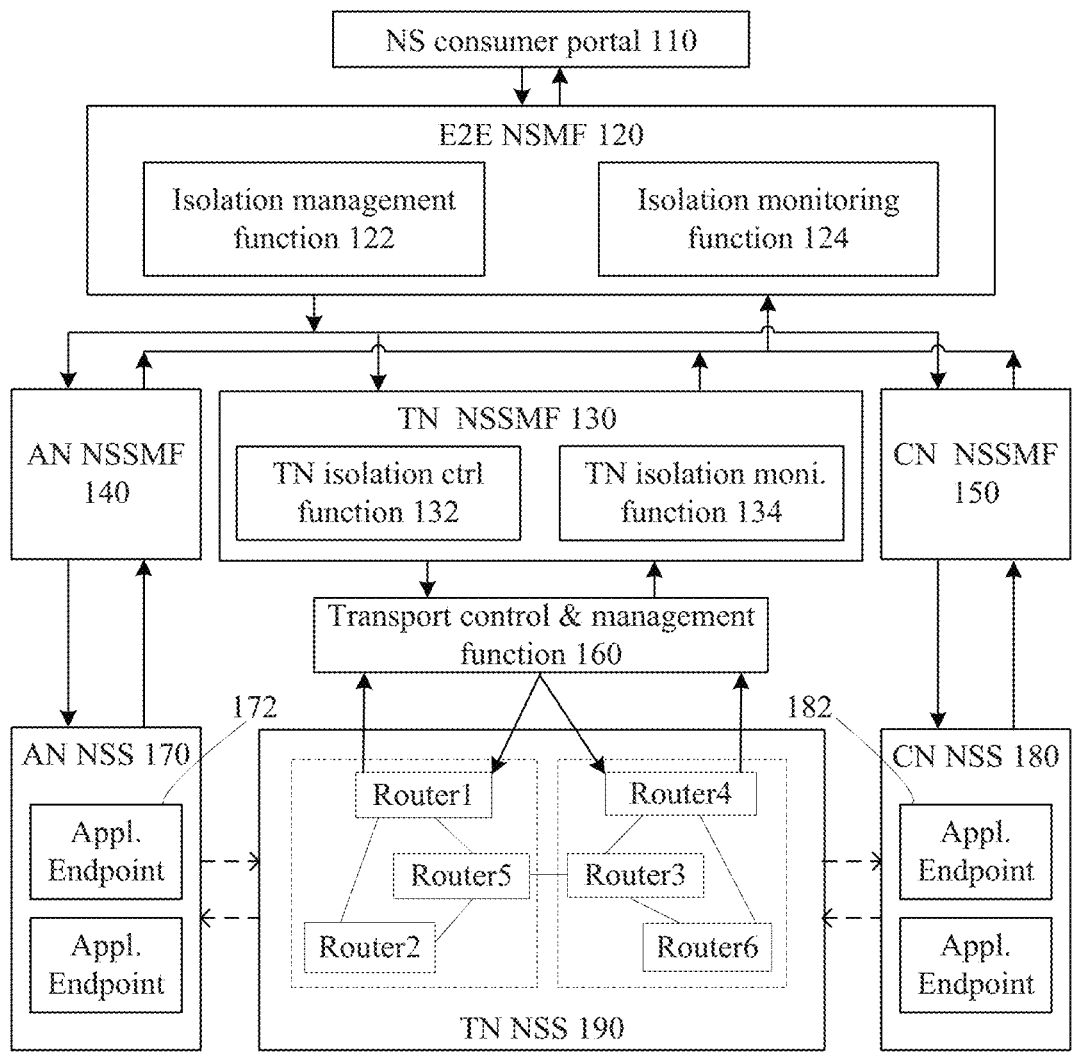
FIG. 2 illustrates a block diagram of network functions for providing E2E slice isolation in accordance with some example embodiments.

FIG. 2 illustrates a block diagram of network functions for providing E2E slice isolation in accordance with some example embodiments. In FIG. 2, network functions the same as or similar to those shown in FIG. 1 are denoted with the same reference signs and repetitive description thereof are omitted herein.

Referring to FIG. 2, the NSMF 120 may include an isolation management function 122 and an isolation monitoring function 124. The isolation management function 122 and the isolation monitoring function 124 each may be deployed as a stand-alone network function or deployed together with other NSMFs for example but not limited to the NS orchestration function at the same host device. The isolation management function 122 may be configured to establish slice isolation policy for a network slice and assist the NSMF 120 to create a network slice instance (NSI) based on the slice isolation policy. The isolation monitoring function 124 may be configured to monitor if the slice isolation policy is properly enforced in the network slice instance. Operations of the isolation management function 122 and the isolation monitoring function 124 will be discussed in detail later.

The TN NSSMF 130 may include a TN isolation control function 132 and a TN isolation monitoring function 134. The TN isolation control function 132 and the TN isolation monitoring function 134 each may be deployed as a stand-alone network function or deployed together with other NSSMFs for example but not limited to the NSS orchestration function at the same host device. The TN isolation control function 132 may be configured to establish isolation policy for a network slice subnet in the TN domain and assist the TN NSSMF 130 to create a network slice subnet (NSS) 190 based on the isolation policy. The TN isolation monitoring function 134 may be configured to collect isolation monitoring data relating to the TN NSS 190, analyze the isolation monitoring data and report analysis results to a isolation monitoring function at a higher layer, for example the isolation monitoring function 124. Operations of the TN isolation control function 132 and the TN isolation monitoring function 134 will be discussed in detail later.

Although not shown in FIG. 2, the domain isolation control function 132 and the domain isolation monitoring function 134 may also be applied in the access network domain and the core network domain. For example, the AN NSSMF 140 may create an AN NSS 170 with assistance of an AN isolation control function, and an AN isolation monitoring function may be configured to monitor isolation of the AN NSS 170. The CN NSSMF 150 may create a CN NSS 180 with assistance of a CN isolation control function, and a CN isolation monitoring function may be configured to monitor isolation of the CN NSS 180.

A transport control and management function 160, which may comprise for example a software defined network (SDN) controller, a network controller, or an SDN orchestrator, is provided to report status of data transport channels to the TN isolation control function 132. In some embodiments, the transport control and management function 160 may periodically and actively report status of active data transport channels to the TN isolation control function 132, or in some embodiments the transport control and management function 160 may report status of active data transport channels to the TN isolation control function 132 in response to a request from the TN isolation control function 132 for status of the active data transport channels. The TN isolation control function 132 may select one or more of the reported data transport channels that comply with the isolation policy for the TN NSS 190 and notify the TN NSSMF 130 of the selected one or more data transport channels. In some embodiments, the request from the TN isolation control function 132 for status of the active data transport channels may include the isolation policy for the TN NSS and the transport control and management function 160 may merely report status of active data transport channels that comply with the isolation policy for the TN NSS to the TN isolation control function 132. In such a case, the TN isolation control function 132 may forward all the reported active data transport channels to the TN NSSMF 130. The TN NSSMF 130 may decide a data transport channel (port or VLAN ID) for the TN NSS 190 in further consideration of for example QoS requirements, security requirements, latency requirements, bandwidth requirements or the like. If necessary, the transport control and management function 160 may create a new data transport channel in the transport network for the TN NSS 190 complying with the isolation policy, the QoS requirements, the security requirements, the latency requirements, and the bandwidth requirements responsive to a request from the TN NSSMF 130. The transport control and management function 160 has the capability to create for example a dedicated data transport channel by allocating dedicated physical/virtual routers, dedicated physical/virtual switches and dedicated physical/virtual circuits. The transport control and management function 160 may be further configured to collect isolation relevant data in the transport network for the TN NSS 190 and report the data to an isolation monitoring function at a higher layer, for example the TN isolation monitoring function 134. Operations of the transport control and management function 160 will be discussed in detail later.

The TN NSS 190 connects the AN NSS 170 at application endpoints 172 and the CN NSS 180 at application endpoints 182. The TN NSS 190 may include allocated network resources for example routers such as routers 1-6, switches, ports, VLAN_IDs, and the like for transport of service data between the AN NSS 170 and the CN NSS 180. The allocated network resources may span multiple resource administration domains. For example, as shown in FIG. 2, the routers 1, 2, 5 may be in a resource administration domain and the routers 3, 4, 6 may be in another resource administration domain.

In the architecture shown in FIG. 2, isolation management/control functions and isolation monitoring functions are provided at both the NS layer and the NSS layer, thereby a fine-grained isolation policy may be supported in E2E network slices. The tenants can monitor enforcement of the isolation policy and, if necessary, update the network slice to correctly fulfill the isolation requirements. A detailed description of support to the fine-grained isolation policy will be given below.

Figure 3:
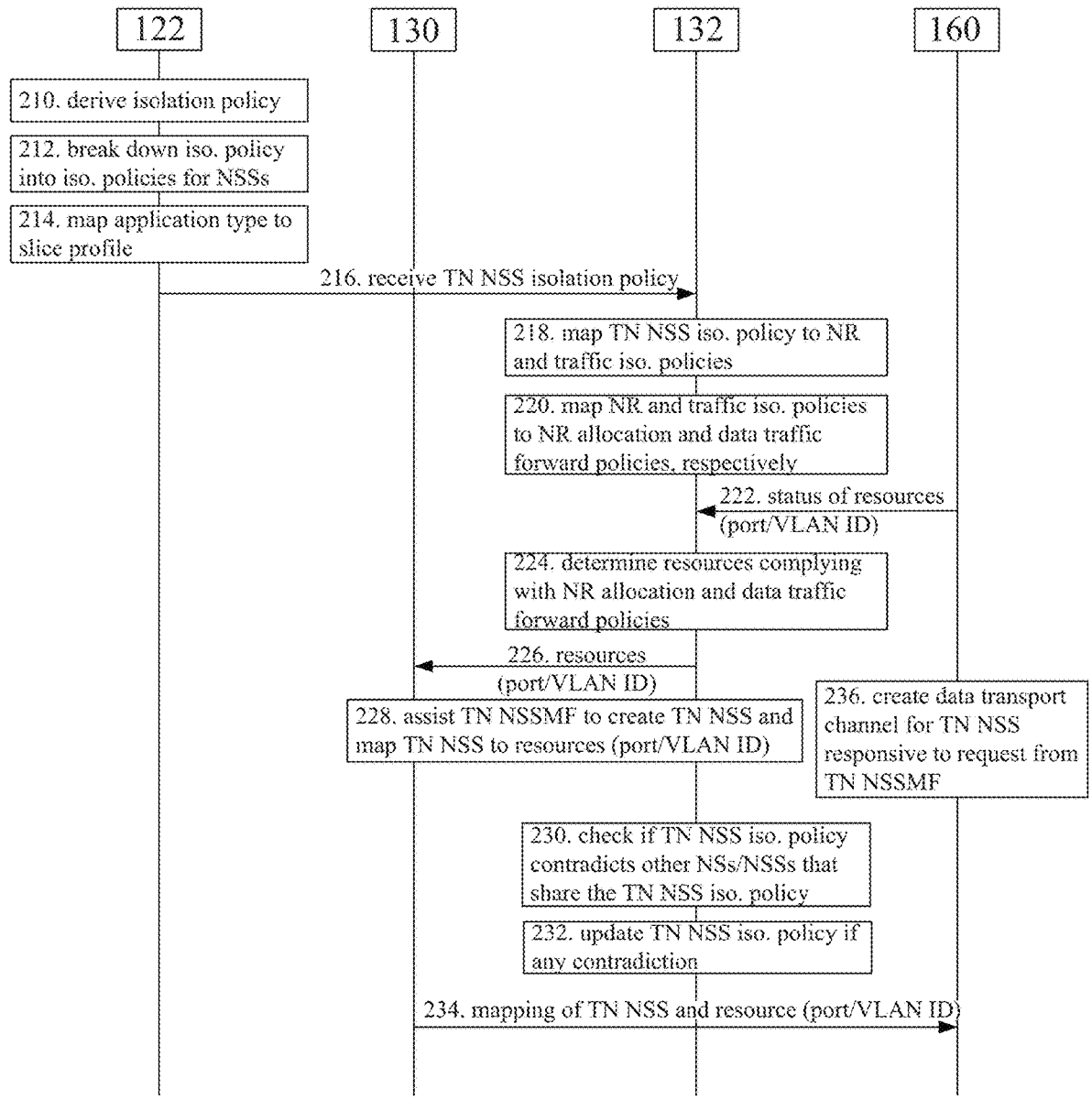
FIG. 3 illustrates an interaction diagram of operations of network functions for providing isolation in a phase of NSI creation in accordance with some example embodiments.

FIG. 3 illustrates an interaction diagram of operations of network functions for providing isolation in a phase of NSI creation in accordance with some example embodiments.

For a better understanding, the below description of interactions shown in FIG. 3 may be read also with reference to FIG. 2. Though FIG. 3 shows interactions relating to network functions in the TN domain, it would be understood that similar interactions may also be applied to network functions in the AN and CN domains.

When the NSMF 120 receives the request to create a slice and the service profile from the network slice consumer portal 110, the isolation management function 122 at the NS layer may derive 210 a slice isolation policy from the service profile. For example, the isolation management function 122 may recognize or identify isolation requirements included in the service profile to obtain or derive the slice isolation policy, and the derived slice isolation policy may be included in the slice profile for the slice to be created. The slice isolation policy is described in an abstract level and can be understood and configured by network slice consumers. The slice isolation policy defined in the E2E slice level is applicable to all domains including AN, CN and TN domains. For example, the slice isolation policy can be "physically isolating network functions (NFs) and connections between NFs of the slice from other slices", or "logically isolating network functions (NFs) and connections between NFs of the slice from other slices", or "no isolation", etc. Physical isolation means that the network slice, including NFs and connections between NFs, should be physically separated from other slices, including for example process and threads isolation, physical memory/storage isolation, and physical network isolation. Logical isolation means that the network slice, including NFs and connections between NFs, should be logically separated from other slices, including for example virtual network resources isolation, virtual network functions isolation, isolation of virtual network links between network functions. No isolation means that the network slice can share network resources with other slices.

The isolation management function 122 may further breakdown 212 the slice isolation policy for the network slice into separate slice isolation policies for an AN NSS, a TN NSS and a CN NSS. Although not shown, the NSMF 120 may also break down the slice profile into separate AN NSS slice profile, TN NSS slice profile and CN NSS slice profile. The AN NSS isolation policy may be included in the AN NSS slice profile, the TN NSS isolation policy may be included in the TN NSS slice profile, and the CN NSS isolation policy may be included in the CN NSS slice profile.

The isolation management function 122 may also map 214 an application type to the slice profile or the NSS slice profiles. The slice profile may include extended information elements (IEs) or attributes to indicate more granular slice and service type (SST), in addition to general SST including eMBB, uRLLC and mMTC. For example, the slice profile may include application level information such as utilities (e.g., gas, water, and electricity), gaming, finance, autonomous driving, etc. Then, the isolation management function 122 may map an application type to the slice profile or the NSS slice profiles. It would benefit support of fine-grained isolation policy, for example utilities (e.g., gas, water, and electricity) data grouped and forwarded together, gaming data forbidden to be forwarded together with financial data, or the like.

When the NSMF 120 calls NSSFMs to create NSS instances in respective domains, the NSS slice profiles including NSS isolation policies are also sent to corresponding NSSMFs. Here, operations in the TN domain (including the TN NSSMF 130, the TN isolation control function 132 and the transport control and management function 160) are discussed with reference to FIG. 3, and operations in the AN domain (including operations of the AN NSSMF 140) and the CN domain (including operations of the CN NSSMF 150) are not described in detail. It would be appreciated that operations similar to those in the TN domain may also be performed in the AN domain and the CN domain.

Continue referring to FIG. 3, the TN isolation control function 132 at the NSS layer may receive 216 the TN NSS isolation policy from the isolation management function 122 at the NS layer, map 218 the TN NSS isolation policy to network resource isolation policy and traffic isolation policy, and further map 220 the network resource isolation policy and traffic isolation policy to network resource allocation policy and data traffic forward policy, respectively. An example of the mapping is shown in the below Table 1.

TABLE 1 mapping between data forward policy and slice isolation policy

| data forward policy at data plane | | | | slice isolation policy in TN NSS domain | |
|---|---|---|---|---|---|
| Network resource allocation policy | Router | standard/undifferentiated dedicated hardware | | no isolation physical network function isolation | Network resource isolation policy |
| | | dedicated software/virtual | | logical network function isolation | |
| | Switch | standard/undifferentiated dedicated hardware | | no isolation physical network function isolation | |
| | | dedicated software/virtual | | logical network function isolation | |
| | Channel | standard/undifferentiated dedicated hardware | | no isolation physical network link isolation | |
| | | dedicated software/virtual | | logical network link isolation | |
| Data traffic forward policy | IPsec | no IPsec | no integrity/confidentiality | no isolation | Traffic isolation policy |
| | | IPsec AH | data origin authentication | medium-level isolation with data origin authentication (security protection level isolation) | |

TABLE 1-continued mapping between data forward policy and slice isolation policy

| data forward policy at data plane | | | | slice isolation policy in TN NSS domain | |
|---|---|---|---|---|---|
| | IPsec ESP | data origin authentication, data integrity, data confidentiality, detection & rejection of replays | | high-level isolation with integrity & confidentiality protection (security protection level isolation) | |
| Filter rules | ACL- white list | data from specific list of VLAN_IDs to be forwarded | data type 1, data type 3, . . . | data type 1: bank service, data type 3: finance service, data type 15: gaming service, . . . | |
| | ACL- black list | data from specific list of VLAN_IDs to be dropped | data type 15, . . . | data type 1 and data type 3 could be grouped and transported over one VLAN_ID, over which data type 15 could not be forwarded (data type isolation) | |
| | other rules | . . . | | . . . | |
| DSCP classes [IETF RFC 4594] | DF (CS0) | standard | | no isolation | |
| | AF21, AF22, AF23 | low-latency data | | uRLLC data (Service type isolation) | |
| | AF11, AF12, AF13 | high- throughput data | | eMBB data (Service type isolation) | |
| | CS1 | low-priority data | | mMTC data (Service type isolation) | |
| | CS4 | real-time interactive | | real-time interactive video conference data (Video type isolation) | |
| | CS3 | broadcast video | | broadcast video data (Video type isolation) | |
| | AF31, AF32, AF33 | multimedia streaming | | multimedia streaming data on demand (Video type isolation) | |
| | . . . | . . . | | . . . | |

The TN NSS isolation policy received from the isolation management function 122 may include a high level isolation requirement for the TN NSS. For example, it may designate only an isolation level defined by Global System for Mobile communication Assembly (GSMA) such as physical isolation, logical isolation or no isolation. At Operation 218, the TN NSS isolation policy may be mapped to fine-grained slice isolation policy including the network resource isolation policy and the traffic isolation policy in consideration of the extended attributes in the TN NSS slice profile. The Network resource isolation policy and traffic isolation policy are TN domain specific policies which are TN technology agnostic. They are derived from the slice isolation policy in the TN domain and will be translated to network resource allocation policy and data traffic forward policy, which will be discussed later. The network resource isolation policy may be used to guide the transport control & management function 160 (e.g., SDN controller, SDN orchestrator or network controller) to deploy and isolate transport devices and the relevant policy may include for example no isolation, physical network function isolation, logical network function isolation, physical network link isolation, logical/virtual network link isolation, and the like. The traffic isolation policy may be used to guide the transport control & management function 160 to configure transport devices to realize traffic separation/isolation and relevant policy may include for example no isolation, service type isolation, data type isolation, video type isolation, security protection level isolation, and the like.

An example of the network resource isolation policy and the traffic isolation policy is shown in the above Table 1. Referring to Table 1, the network resource isolation policy includes attributes such as no isolation, physical network function isolation and logical network function isolation, physical network link isolation, logical network function, and the traffic isolation policy includes attributes such as no isolation, service type isolation, data type isolation, video type isolation, security protection level isolation (e.g., medium-level isolation with data origin authentication, high-level isolation with integrity and confidentiality protection), and the like. For example, according to security requirements specified in the TN NSS slice profile, the TN NSS isolation policy may be mapped to one of no isolation, service type isolation, data type isolation, video type isolation, service type isolation, data type isolation, video type isolation, security protection level isolation (e.g., medium-level isolation with data origin authentication and high-level isolation with integrity & confidentiality protection) in the traffic isolation policy. Based on data type, isolation rules for the data transportation may be determined. For example, the bank service data and the finance service data could be grouped and transported over one VLAN ID, while gaming service data should not be transported over the VLAN ID. Based on the service type, isolation for uRLLC data, isolation for eMBB data, isolation for mMTC data or no isolation may be applied in the traffic isolation policy. Based on the video type, isolation for real-time interactive video conference data, isolation for broadcast video data or isolation for multimedia streaming data on demand may be applied in the traffic isolation policy. It would be appreciated that different or more attributes may be defined in the network resource isolation policy and the traffic isolation policy.

At Operation 220, the network resource isolation policy is mapped to the network resource allocation policy, and the traffic isolation policy is mapped to the data traffic forward policy. The network resource allocation policy and data traffic forward policy are TN specific policies especially for IP networks, and the policies shall be interpreted by transport control & management function (including for example SDN orchestrator, SDN controller or network controller) and finally used to allocate and configure the network devices. For example, the network resource allocation policy may comprise standard/undifferentiated isolation, dedicated hardware for transport network resources such as routers, switches and channels, dedicated software for transport network resources such as routers, switches and channels, logical isolated virtual transport network resources such as routers, switches and channels, etc. The data traffic forward policy may comprise for example standard/undifferentiated isolation, IPSec related rules, access control/filter rules, DSCP (Differentiated Services Code Point) rules, forward rules in flow table, and the like. The IPsec rules may include for example no IPsec, IPsec authentication header (AH), and IPsec encapsulating security payload (ESP). AH and ESP are two protocols defined by the IETF. The AH protocol provides a mechanism for authentication only, and the ESP protocol provides data confidentiality and data authentication (integrity, origin authentication, and replay protection). The filter rules may include for example access control list (ACL)—white list and ACL—black list. For example, data from VLAN IDs in the ACL—white list would be forwarded, while data from VLAN IDs in the ACL—black list would be dropped. The DSCP rules (Differentiated Services Code Point) are defined in IETF RFC 4594 to identify priority of service data. As shown in Table 1, data type, service type and video type may be mapped to corresponding DSCP classes. Although not shown in Table 1, the forward rules in flow table may define data traffic forwarding rules in OpenFlow Logical Switches. The flow table may contain a set of flow entries comprising fields such as match fields, priority, counters, instructions, etc. Based on service type isolation, for example, uRLLC applications with low latency and high reliability could be classified into the high priority of a flow entry in the flow table, while mMTC applications could be classified into the low priority of a flow entry in the flow table. It would be appreciated that the above-mentioned data traffic forward rules are described as examples, and different or additional rules may also be defined and applied as the data traffic forward policy.

It would be understood that by the two level mappings at Operations 218, 220, fine-grained isolation policy for the TN domain is established and corresponding network resource allocation requirements and data traffic forward requirements are determined for the TN domain. By applying the network resource allocation requirements and data traffic forward requirements for creation of the TN NSS 190, fine-grained isolation would be well supported in the TN NSS 190.

Continue referring to FIG. 3, the TN isolation control function 132 may receive 222 status of resources for example data transport channels represented by ports or VLAN IDs in the transport network from the transport control & management function 160, and determine 224 data transport channels that comply with the network resource allocation policy and the data traffic forward policy based on the status of the data transport channels. The determined data transport channels may be notified 226 to the TN NSSMF 130 for creation of the TN NSS 190. In some embodiments, the transport control and management function 160 may periodically and actively report status of active data transport channels to the TN isolation control function 132, or in some embodiments the transport control and management function 160 may report status of active data transport channels to the TN isolation control function 132 in response to a request from the TN isolation control function 132 for status of the active data transport channels. The TN isolation control function 132 may select one or more of the reported data transport channels that comply with the network resource allocation policy and the data traffic forward policy for the TN NSS 190 and notify the TN NSSMF 130 of the selected one or more data transport channels. In some embodiments, the request from the TN isolation control function 132 for status of the active data transport channels may further include the network resource allocation policy and the data traffic forward policy for the TN NSS 190 and the transport control and management function 160 may merely report status of active data transport channels that comply with the network resource allocation policy and the data traffic forward policy for the TN NSS 190 to the TN isolation control function 132. In such a case, the TN isolation control function 132 may select all the reported active data transport channels and forward them to the TN NSSMF 130. Then, the TN isolation control function 132 may assist 228 the TN NSSMF 130 to create the TN NSS 190 according to the network resource isolation policy and the traffic isolation policy. The TN NSS 190 may have Single-Network Slice Selection Assistance Information (S-NSSAI) to uniquely identify the network slice. In Operation 228, the TN NSSMF 130 may further determine a data transport channel represented by a port or VLAN ID for the TN NSS 190 in further consideration of for example QoS requirements, security requirements, latency requirements, bandwidth requirements and other factors and map the TN NSS 190 (for example, the S-NSSAI) to the port or VLAN ID. If one or more of the data transport channels reported from the TN isolation control function 132 also comply with for example the QoS requirements, the security requirements, the latency requirements, the bandwidth requirements and/or other requirements for the TN NSS 190, the TN NSSMF 130 may select and reuse at least one data transport channel from the one or more of the data transport channels reported from the TN isolation control function 132 and map the TN NSS 190 to the selected/reused data transport channel. If none of the data transport channels reported from the TN isolation control function 132 complies with the QoS requirements, the security requirements, the latency requirements, the bandwidth requirements and other requirements for the TN NSS 190, the TN NSSMF 130 may send a request for creating a data transport channel to the transport control & management function 160 along with the isolation policy (including the network resource allocation policy and the data traffic forward policy), the QoS requirements, the security requirements, the latency requirements, the bandwidth requirements and the like. Then, the transport control & management function 160 may create 236 a new data transport channel for the TN NSS 190 complying with the isolation policy, the QoS requirements, the security requirements, the latency requirements and the bandwidth requirements. For example, when a tenant requests to create an E2E network slice with physical or logical isolation, the transport control & management function 160 would create a dedicated data transport channel with allocating dedicated physical or virtual routers, dedicated physical or virtual switches, and dedicated physical or virtual links. The TN NSSMF 130 may map the TN NSS 190 to the created data transport channel. The TN isolation control function 132 may also assist the TN NSSMF 130 to manage the mapping between the S-NSSAI and the port/VLAN ID together with attributes shown in the above Table 1.

In some embodiments, the TN isolation control function 132 may check 230 if the TN slice isolation policy for the TN NSS 190, including the network resource isolation policy and the traffic isolation policy, has contradiction with other network slices or network slice subnets that share the same isolation policy. If yes, the TN isolation control function 132 may update 232 the TN NSS 190 with new resource allocation policy and/or data traffic forward policy to remove the contradiction. For example, an existing slice for a bank service is mapped to a VLAN ID x, and a new slice for a gaming service decides to reuse the slice isolation for the existing slice, but the VLAN ID x does not allow simultaneous transport of bank data and gaming data. Then, the TN isolation control function 132 may select or create a new VLAN ID for the new slice.

The TN NSSMF 130 may send 234 the mapping between the TN NSS 190 and the data transport channel to the transport control & management function 160. The transport control & management function 160 may configure edge routers according to the mapping relationship between the TN NSSs and the data transport channels to prevent data of other slices from being transported through the dedicated physical or virtual data transport channel allocated for the TN NSS 190.

Here some examples of TN NSSs with a corresponding isolation policy will be described.

Example 1

A uRLLC NS consumer C1 requests to create a network slice with physical isolation. Consequently, S-NSSAI-1 is created for this NS consumer. For the TN NSS domain, TN-NSS-1 is created with allocating dedicated hardware routers, switches and physical circuits. The corresponding incoming data of S-NSSAI-1 will be transported over port_1/device_1 of TN-NSS-1 with low-latency data transport, data origin authentication, data integrity protection and confidentiality protection.

Example 2

An eMBB NS consumer C2 requests to create a network slice with logical isolation. The S-NSSAI-2 is created for this NS consumer. For the TN NSS domain, TN-NSSI-2 is created with allocating dedicated software routers, switches and virtual data transport channels. The corresponding incoming data of S-NSSAI-2 will be transported over VLAN_ID-2 of TN-NSS-2 with high-throughput data transport, data origin authentication. The channel VLAN_ID-2 of TN-NSS-2 is configured to transport financial data, but for example gaming data is forbidden to be transported over the channel VLAN_ID-2.

Example 3

An mMTC NS consumer C3 requests to create a network slice without isolation requirements. The S-NSSAI-3 is created for this NS consumer. For the TN NSS domain, TN-NSS-3 may be created with allocating standard network resources (e.g., standard routers, standard switches, and standard data transport channels). The corresponding incoming data of S-NSSAI-3 will be transported over VLAN_ID-3 of TN-NSS-3 with standard data transport policy.

Example 4

A gaming service provider NS Consumer C4 request to create a network slice with logical isolation. It is assumed that the TN-NSS-1, TN-NSS-2, TN-NSS-3 have been created. The NSMF 120 breaks down this request and calls AN/TN/CN NSS management functions separately to create network slice subnets. The NSMF 120 also breaks down E2E network slice isolation policy to separate slice isolation policy for each NSS.

The TN isolation control function 132 of the TN NSS domain receives the TN NSS isolation policy and further breaks down the TN NSS isolation policy to network resource isolation policy and traffic isolation policy. The TN isolation control function 132 also maps the network resource isolation policy and traffic isolation policy to network resource allocation policy and data traffic forward policy, respectively. For example, the network resource allocation policy is obtained as follows: dedicated software routers, dedicated software switches, dedicated virtual channel; and the data traffic forward policy is obtained as follows: high throughput data, real-time interactive video conference data, no data integrity/confidentiality, no data origin authentication.

It is assumed that the network slice identification for the requested gaming service provider is S-NSSAI_30. With assistance of the TN isolation control function 132, the TN NSSMF 130 decides to reuse TN-NSS-2 according to the obtained network resource isolation policy. However, VLAN_ID-2 of TN-NSS-2 is configured so that gaming data is forbidden and could not be reused to transport data for S-NSSAI_30. Consequently, VLAN_ID-8 of TN-NSS-2 is created and applied to transport data for S-NSSAI_30.

With assistance of the TN isolation control function 132, the TN NSSMF 130 and/or the transport control & management function 160 configure data transport channel according to the obtained network resource allocation policy and the data traffic forward policy, i.e., incoming data of S-NSSAI_30 will be transported over VLAN_ID-8 of TN-NSS-2.

The mapping between S-NSSAI and port/VLAN_ID for Examples 1-4 is shown in Table 2.

TABLE 2

Mapping between S-NSSAI and port/VLAN ID

| | S-NSSAI | S-NSSAI-1 | S-NSSAI-2 | S-NSSAI-3 | S-NSSAI-30 |
|---|---|---|---|---|---|
| | Service type | uRLLC | eMBB | mMTC | eMBB |
| | TN NSS | TN-NSS-1 | TN-NSS-2 | TN-NSS-3 | TN-NSS-2 |
| | port/VLAN_ID | Port_1/device_1 | VLAN_ID-2 | VLAN_ID-3 | VLAN_ID-8 |
| Router | standard/undifferentiated dedicated hardware | √ | | √ | |
| | dedicated software/virtual | | √ | | √ |
| Switch | standard/undifferentiated dedicated hardware | √ | | √ | |
| | dedicated software/virtual | | √ | | √ |
| Channel | standard/undifferentiated dedicated hardware | √ | | √ | |
| | dedicated software/virtual | | √ | | √ |
| IPsec | no IPsec | no integrity/confidentiality | | √ | √ |
| | IPsec AH | data origin authentication | | √ | |
| | IPsec ESP | data origin authentication, data integrity, data confidentiality, detection & rejection of replays | √ | | | |
| Filter rules | ACL-white list | data from specific list of VLAN IDs to be forwarded | | | | |
| | ACL-black list | data from specific list of VLAN IDs to be dropped | | √ gaming data forbidden | | |
| | other rules | . . . | | | | |
| DSCP | DF (CS0) | standard | | | √ | |
| | AF21, AF22, AF23 | low-latency data | √ | | | |
| | AF11, AF12, AF13 | high-throughput data | | √ | | √ |
| | CS1 | low-priority data | | | | |
| | CS4 | real-time interactive | | | | √ |
| | CS3 | broadcast video | | | | |
| | AF31, AF32, AF33 | multimedia streaming | | | | |
| | . . . | . . . | | | | |

Figure 4:
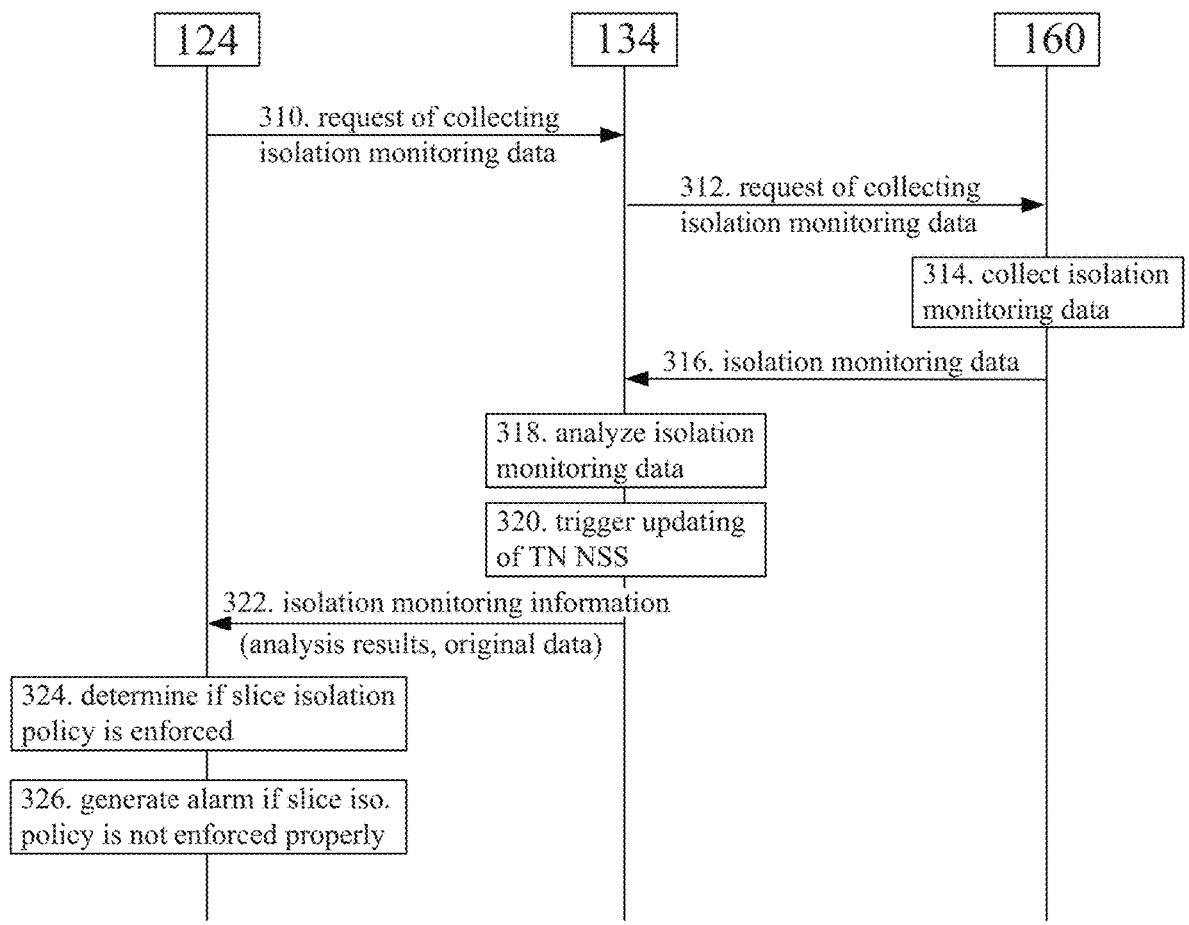
FIG. 4 illustrates an interaction diagram of operations of network functions for monitoring isolation in a phase of NSI running in accordance with some example embodiments.

FIG. 4 illustrates an interaction diagram of operations of network functions for monitoring isolation in a phase of NSI running in accordance with some example embodiments. For a better understanding, the below description of interactions shown in FIG. 4 may be read also with reference to FIGS. 2-3. Though FIG. 4 shows interactions relating to network functions in the TN domain, it would be understood that similar interactions may also be applied to network functions in the AN and CN domains.

When the network slice, including the AN NSS 170, the TN NSS 190 and the CN NSS 180, is created and operates to provide services for the tenants, the tenants can monitor operation of the network slice to check if the slice isolation policy is correctly enforced through isolation monitoring functions deployed at the NS layer and the NSS layer as shown in FIG. 2. In some embodiments, the isolation monitoring function 124 at the NS layer may send 310 a request for collecting isolation monitoring data to respective domain isolation monitoring functions at the NSS layer, including the TN isolation monitoring function 134. Responsive to the request received from the isolation monitoring function 124, the TN isolation monitoring function 134 may send 312 a request for collecting isolation monitoring data to the transport control and management function 160. In some embodiments, the TN isolation monitoring function 134 may periodically send 312 the request for collecting isolation monitoring data to the transport control and management function 160, and the operation 310 may be omitted.

Responsive to the request from the TN isolation monitoring function 134, the transport control and management function 160 may collect 314 isolation monitoring data from the transport network. The transport control and management function 160 may collect isolation relevant data from routers, switches, ports, VLAN IDs, channels allocated to the TN NSS 190. For example, the transport control and management function 160 may monitor if data traffic of a particular service is transported via the allocated network resources, or if the allocated network resources further transport additional service data. Then, the transport control and management function 160 may report 316 the collected isolation monitoring data to the TN isolation monitoring function 134. In some embodiments, the TN isolation monitoring function 134 may also collect isolation monitoring data from the TN NSSMF 130 (not shown in FIG. 4).

The TN isolation monitoring function 134 may analyze 318 the isolation monitoring data to determine if the slice isolation policy for the TN NSS 190 is satisfied during operation of the TN NSS 190. For example, the TN isolation monitoring function 134 may check if attributes shown in Table 2 for a TN NSS are correctly enforced. Then, the TN isolation monitoring function 134 may report 322 isolation monitoring information including the analysis results or together with the original isolation monitoring data to an isolation monitoring function at a higher layer, for example the isolation monitoring function 124 at the NS layer. In some embodiments, if it is determined that the slice isolation policy for the TN NSS 190 is not fulfilled, the TN isolation monitoring function 134 may trigger 320 updating of the TN NSS 190 to comply with the TN slice isolation policy. For example, if the TN isolation monitoring function 134 finds that bank service data and gaming service data are transported via the same VLAN ID while the slice isolation policy for the bank service slice specifies that the bank service data should be isolated from gaming service data, the TN isolation monitoring function 134 may trigger updating of the bank service slice, and the TN isolation control function 132 may assist the TN NSSMF 130 to reconfigure or create a new VLAN ID for the bank service slice. In some embodiments, the operation 320 may be performed at a higher layer, for example by the isolation monitoring function 124.

It would be appreciated that, in addition to the isolation monitoring information from the TN isolation monitoring function 134, the NS isolation monitoring function 124 may also receive isolation monitoring information from the AN domain and the CN domain. Then, the NS isolation monitoring function 124 may determine 324 if the slice isolation policy is properly enforced during operation of the NSSs. As discussed above, the isolation monitoring information comprises analysis results of isolation monitoring data with respect to fine-grained attributes such as those shown in Tables 1-2 that are refined from the slice isolation policy by the NS isolation management function 122. Therefore, the example embodiments can achieve fine control, management and monitoring of the slice isolation policy.

If the NS isolation monitoring function 124 determines that the slice isolation policy is not properly enforced in the network slice, it may generate 326 an alarm to inform the tenant or network operator of an isolation violation event. In some embodiments, the NS isolation monitoring function 124 may also trigger updating of the slice to comply with the slice isolation policy.

Figure 5:
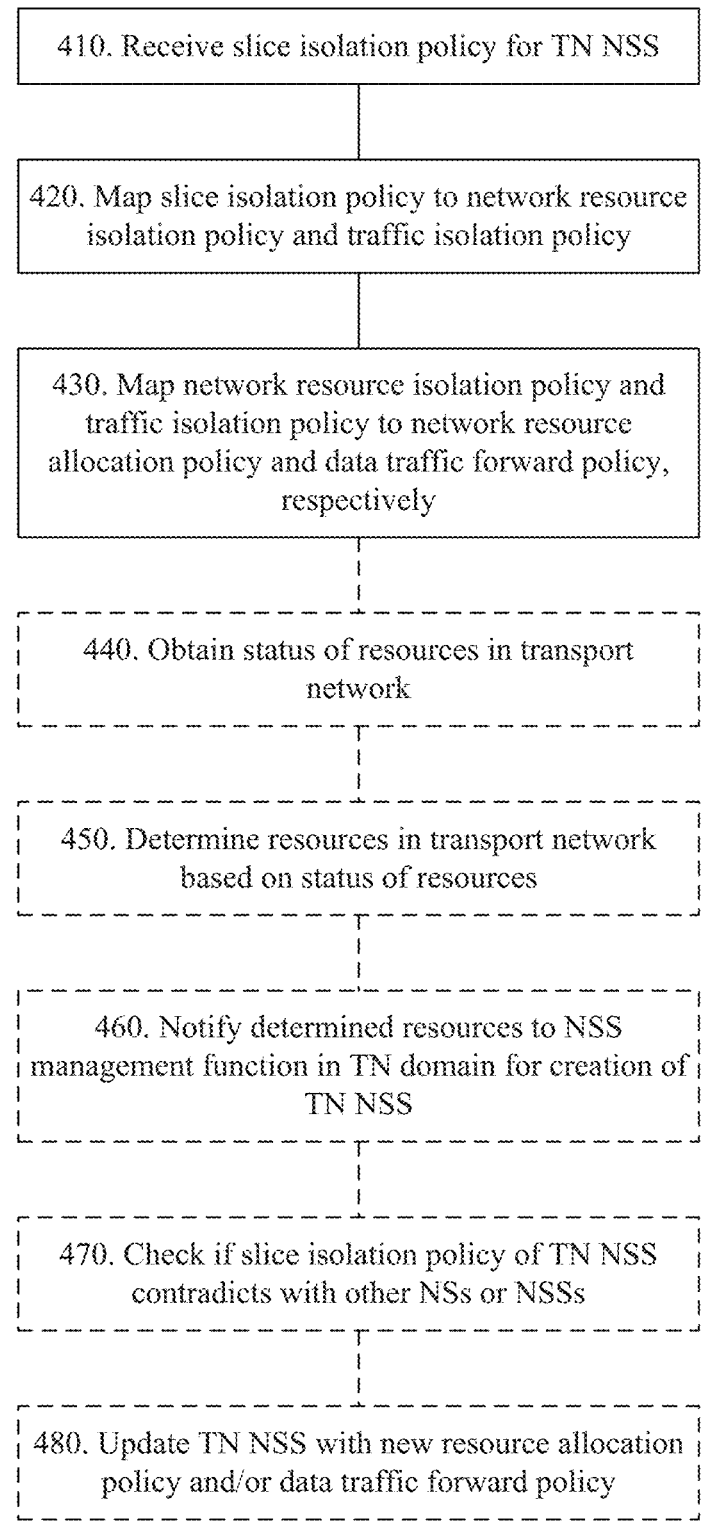
FIG. 5 illustrates a flow chart of a method for isolation of a network slice in accordance with some example embodiments.

FIG. 5 illustrates a flow chart of a method 400 for isolation of a network slice in accordance with some example embodiments. The method 400 may be performed for example at a network function unit such as the TN isolation control function 132.

As shown in FIG. 5, the example method 400 may include a step 410 of receiving slice isolation policy for a NSS in a TN domain, a step 420 of mapping the slice isolation policy to network resource isolation policy and traffic isolation policy, and a step 430 of mapping the network resource isolation policy and the traffic isolation policy to network resource allocation policy and data traffic forward policy, respectively. The network resource allocation policy and the data traffic forward policy may be applied to creation of the TN NSS.

The slice isolation policy for a NSS in a TN domain may be for example the isolation policy for the TN NSS 190. During creation of the TN NSS 190, the NSMF 120 or the isolation management function 122 therein may send the isolation policy for the TN NSS 190 to the TN NSSMF 130 or the TN isolation control function 132. In the step 420 and the step 430, two level mapping is performed on the slice isolation policy for the TN NSS so that fine-grained network resource isolation policy, traffic isolation policy, network resource allocation policy and data traffic forward policy are obtained for the TN NSS, of which an example is shown in the above Table 1. The network resource allocation policy and the data traffic forward policy are applied to create the TN NSS 190.

In some embodiments, the network resource isolation policy may include one or more of following attributes: no isolation, physical network function isolation, logical network function isolation, physical network link isolation, logical/virtual network link isolation, etc. The traffic isolation policy may include one or more of following attributes: no isolation, service type isolation, data type isolation, video type isolation, security protection level isolation, and so on. The service type isolation may include for example uRLLC service, eMBB service, mMTC service and the like. The data type isolation may include for example bank data, finance data, gaming data, smart grid data, logistics data, and the like. The video type isolation may include for example real-time interactive video conference data, broadcast video data, multimedia streaming data on demand, and the like. The security protection level isolation may include for example medium-level isolation with data origin authentication, high-level isolation with integrity and confidentiality protection, and so on.

In some embodiments, the method 400 may optionally include a step 440 of obtaining status of resources in the transport network, a step 450 of determining resources in the transport network that comply with the network resource allocation policy and the data traffic forward policy based on the obtained status of resources in the transport network, and a step 460 of notifying the determined resources in the transport network to an NSS management function in the TN domain for creation of the TN NSS.

In the step 440, the TN isolation control function 132 may obtain status of data transport channels in the transport network from the transport control & management function 160. In the step 450, the TN isolation control function 132 may select data transport channels that comply with the network resource allocation policy and the data traffic forward policy based on the status of the data transport channels. When the determined/selected data transport channels are notified to the TN NSSMF 130, the TN NSSFM 130 may decide the data transport channel (port/VLAN ID) for the TN slice subnet to be created in further consideration of for example security, QoS or additional requirements. For example, if the selected data transport channels also comply with the security requirements, the latency requirements, the bandwidth requirements and the QoS requirements for the TN NSS to be created, the TN NSSFM 130 may map the TN NSS to at least one of the selected data transport channels. On the other hand, if none of the selected data transport channels complies with the security requirements and the QoS requirements for the TN NSS to be created, the TN NSSFM 130 may request the transport control & management function 160 to create a new data transport channel complying with the network resource allocation policy, the data traffic forward policy, the latency requirements, the bandwidth requirements, the security requirements and the QoS requirements, and map the TN NSS to the created data transport channel.

In some embodiments, the method 400 may optionally include a step 470 of checking if the slice isolation policy for the TN NSS 190 has contradiction with other network slices or NSSs when the slice isolation policy is shared by the TN NSS 190 and the other network slices or NSSs and a step 480 of updating the TN NSS 190 with new resource allocation policy and/or data traffic forward policy to remove the contradiction.

Figure 6:
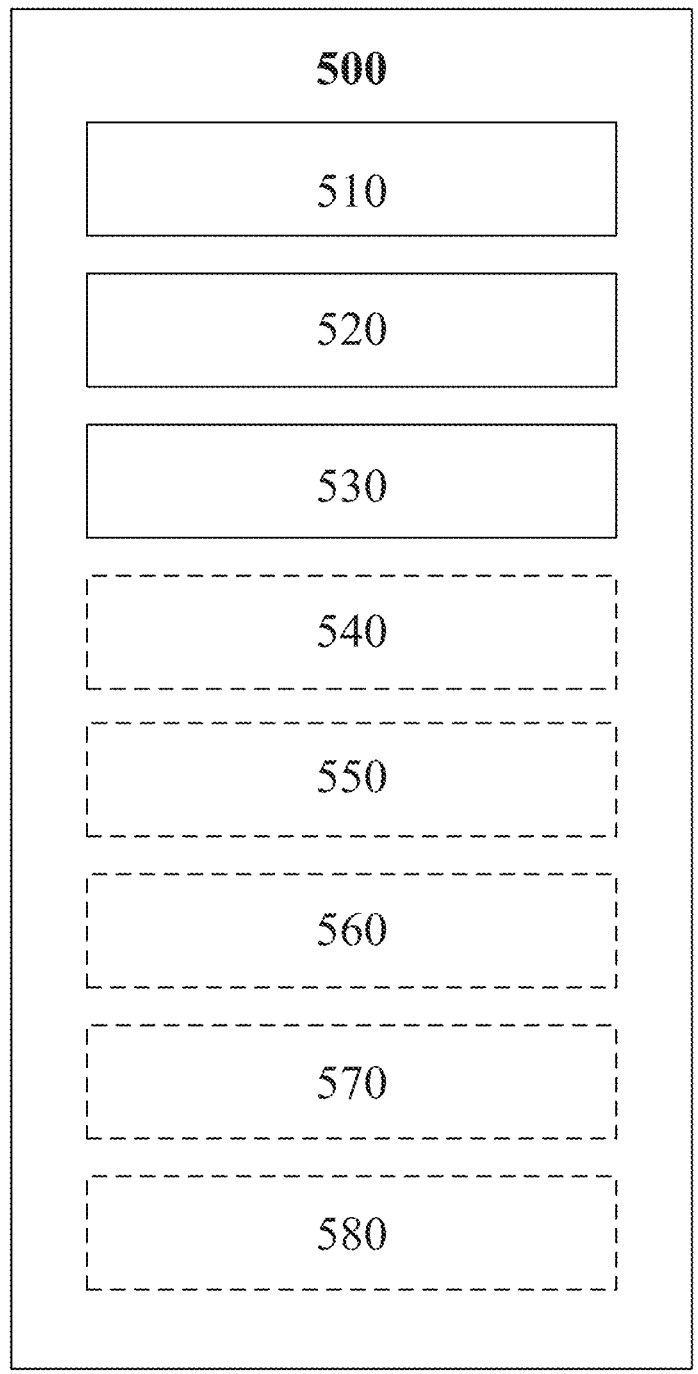
FIG. 6 illustrates a block diagram of an apparatus in accordance with some example embodiments.

FIG. 6 illustrates a block diagram of an apparatus 500 in accordance with some example embodiments. The apparatus may be implemented in for example the TN isolation control function 132 to perform the method 400 shown in FIG. 5. Referring to FIG. 6, the apparatus 500 may include a first means (or module) 510 for performing the step 410 of the method 400, a second means 520 for performing the step 420 of the method 400, and a third means 530 for performing the step 430 of the method 400. Optionally, the apparatus 500 may further include a fourth means 540 for performing the step 440 of the method 400, a fifth means 550 for performing the step 450 of the method 400, a sixth means 560 for performing the step 460 of the method 400, a seventh means 570 for performing the step 470 of the method 400, and an eighth means 580 for performing the step 480 of the method 400.

Figure 7:
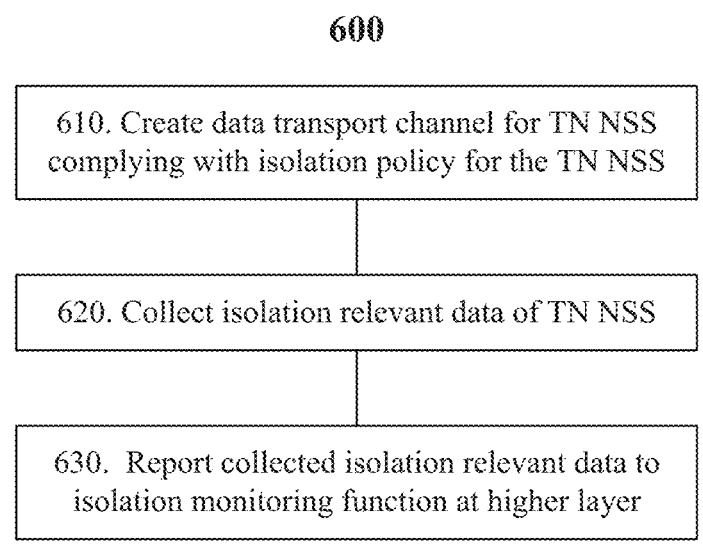
FIG. 7 illustrates a flow chart of a method for isolation of a network slice in accordance with some example embodiments.

FIG. 7 illustrates a flow chart of a method 600 for isolation of a network slice in accordance with some example embodiments. The method 600 may be performed for example in a network function unit such as the transport control and management function 160 shown in FIG. 2.

Referring to FIG. 7, the method 600 may include a step 610 of creating a data transport channel for a NSS in a TN complying with isolation policy for the TN NSS, a step 620 of collecting isolation relevant data of the TN NSS during operation of the TN NSS, and a step 630 of reporting the collected isolation relevant data to an isolation monitoring function at a higher layer.

In the step 610, the transport control and management function 160 may create the data transport channel for the TN NSS 190 in response to a request from the TN NSSMF 130. For example, when none of the existing data transport channel satisfies requirements of the TN NSS 190 including for example the isolation policy, the QoS requirements, the security requirements, the latency requirements and the bandwidth requirement, the TN NSSMF 130 may request the transport control and management function 160 to create a new data transport channel for the TN NSS 190. The transport control and management function 160 may create the new data transport channel for the TN NSS 190 by allocating network resources such as routers, switches and the like for the TN NSS 190. For example, a dedicated physical or logical data transport channel for the TN NSS 190 may be created by allocating dedicated physical or logical router, dedicated physical or logical switches and dedicated physical or logical circuits.

In the step 620, isolation relevant data of the TN NSS 190 may be collected during operation of the TN NSS 190. The isolation relevant data may be collected from for example network resources such as routers and switches allocated to the TN NSS 190 or from apparatus controlling or managing the network resources allocated to the TN NSS 190. In the step 630, the collected isolation relevant data may be reported to an isolation monitoring function at a higher layer, for example the TN isolation monitoring function 134 at the NSS layer or the isolation monitoring function 124 at the NS layer.

Figure 8:
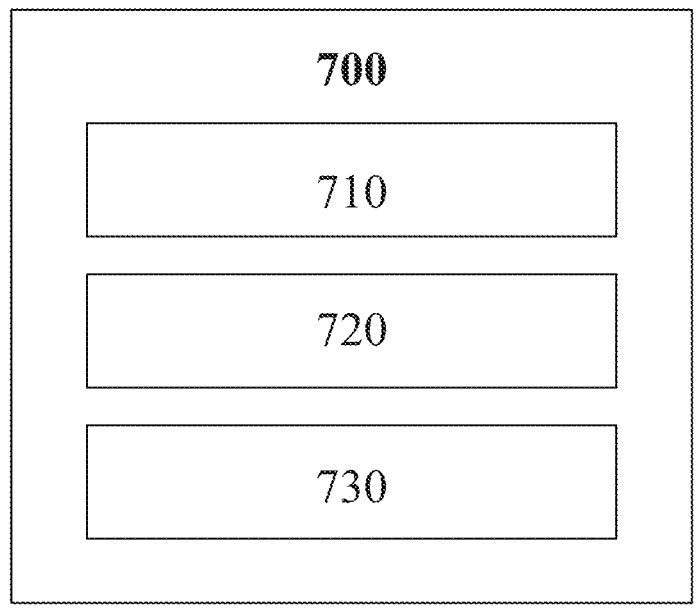
FIG. 8 illustrates a block diagram of an apparatus in accordance with some example embodiments.

FIG. 8 illustrates a block diagram of an apparatus 700 in accordance with some example embodiments. The apparatus may be implemented in for example the transport control and management function 160 to perform the method 600 shown in FIG. 7. Referring to FIG. 8, the apparatus 700 may include a first means (or module) 710 for performing the step 610 of the method 600, a second means 720 for performing the step 620 of the method 600, and a third means 730 for performing the step 630 of the method 600.

Figure 9:
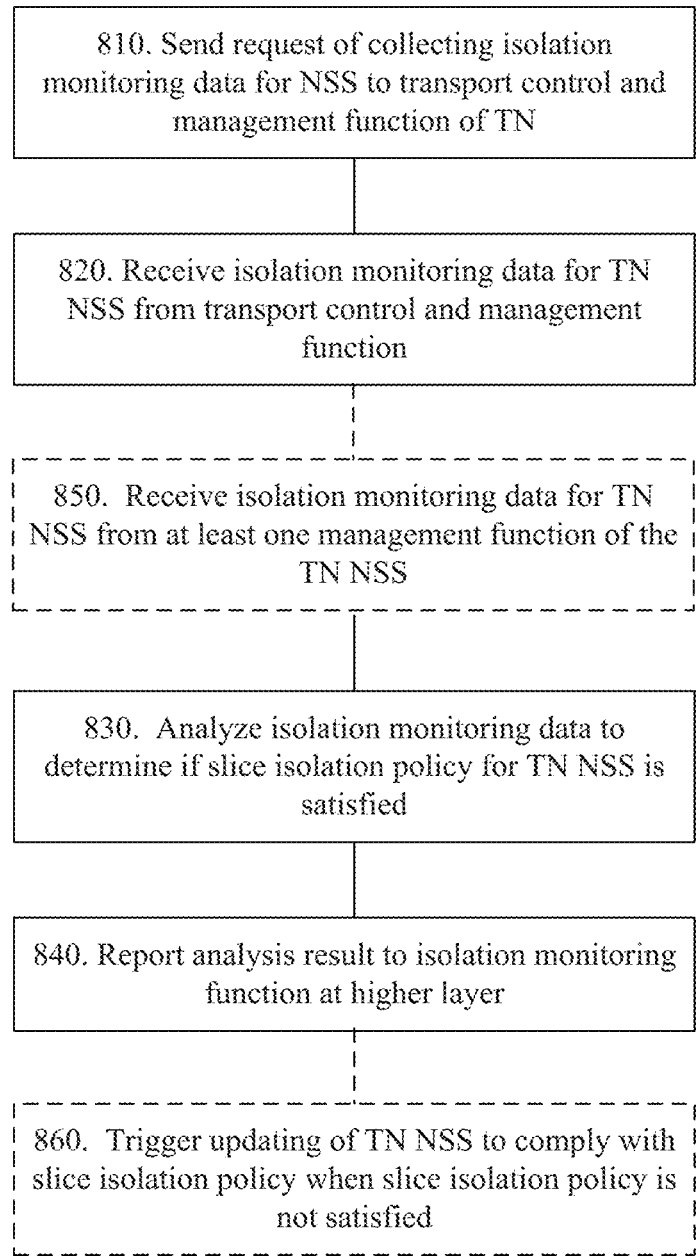
FIG. 9 illustrates a flow chart of a method for monitoring isolation of a network slice in accordance with some example embodiments.

FIG. 9 illustrates a flow chart of a method 800 for monitoring isolation of a network slice in accordance with some example embodiments. The method 800 may be performed for example in a network function unit such as the TN isolation monitoring function 134.

Referring to FIG. 9, the method 800 may include a step 810 of sending a request of collecting isolation monitoring data for a NSS to a transport control and management function of a TN, a step 820 of receiving the isolation monitoring data for the TN NSS 190 from the transport control and management function, a step 830 of analyzing the isolation monitoring data to determine if slice isolation policy for the TN NSS 190 is satisfied during operation of the TN NSS 190, and a step 840 of reporting the analysis result of the isolation monitoring data to an isolation monitoring function at a higher layer.

For example, during operation of the TN NSS 190, the TN isolation monitoring function 134 may send 810 the request of collecting isolation monitoring data to for example the transport control and management function 160. The request may be sent periodically or responsive to an instruction from a higher layer, for example from the isolation monitoring function 124 at the NS layer. Then, the TN isolation monitoring function 134 may receive 820 the isolation monitoring data for the TN NSS 190 from the transport control and management function 160 and analysis 830 the isolation monitoring data to determine if the slice isolation policy for the TN NSS 190 is satisfied during operation of the TN NSS 190. In some embodiments, the TN isolation monitoring function 134 may also receive the isolation monitoring data for the TN NSS 190 from at least one management function of the TN NSS 190 such as the TN NSSMF 130. In the step 840, the analysis results of the isolation monitoring data, or together with the original isolation monitoring data, are reported to for example the isolation monitoring function 124 at the NS layer.

In some embodiments, the method 800 may optionally include a step 850 of receiving isolation monitoring data from at least one management function of the TN NSS 190, for example the TN NSSMF 130, and a step 860 of triggering updating of the TN NSS 190 to comply with the slice isolation policy for the TN NSS 190 when it is determined that the slice isolation policy for the TN NSS 190 is not satisfied during operation of the TN NSS 190 in the step 830. For example, the TN NSS 190 may be reconfigured or allocated with new resources to comply with the isolation policy.

Figure 10:
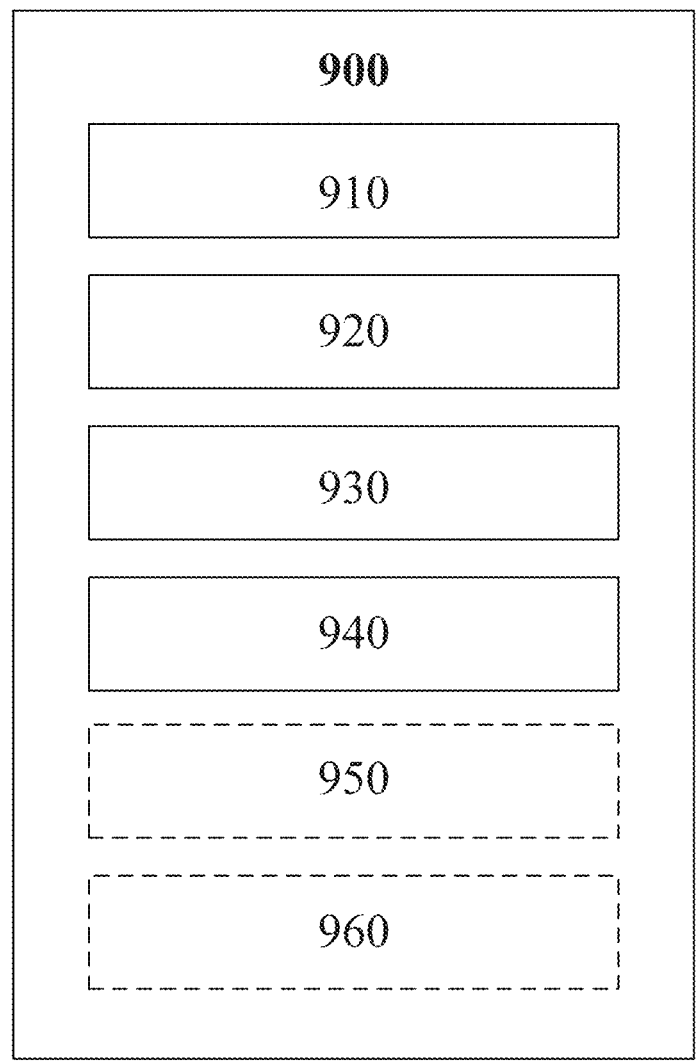
FIG. 10 illustrates a block diagram of an apparatus in accordance with some example embodiments.

FIG. 10 illustrates a block diagram of an apparatus 900 in accordance with some example embodiments. The apparatus may be implemented in for example the TN isolation monitoring function 134 to perform the method 800 shown in FIG. 9. Referring to FIG. 10, the apparatus 900 may include a first means (or module) 910 for performing the step 810 of the method 800, a second means 920 for performing the step 820 of the method 800, a third means 930 for performing the step 830 of the method 800, and a fourth means 940 for performing the step 840 of the method 800. Optionally, the apparatus 900 may include a fifth means 950 for performing the step 850 of the method 800, and a sixth means 960 for performing the step 860 of the method 800.

Figure 11:
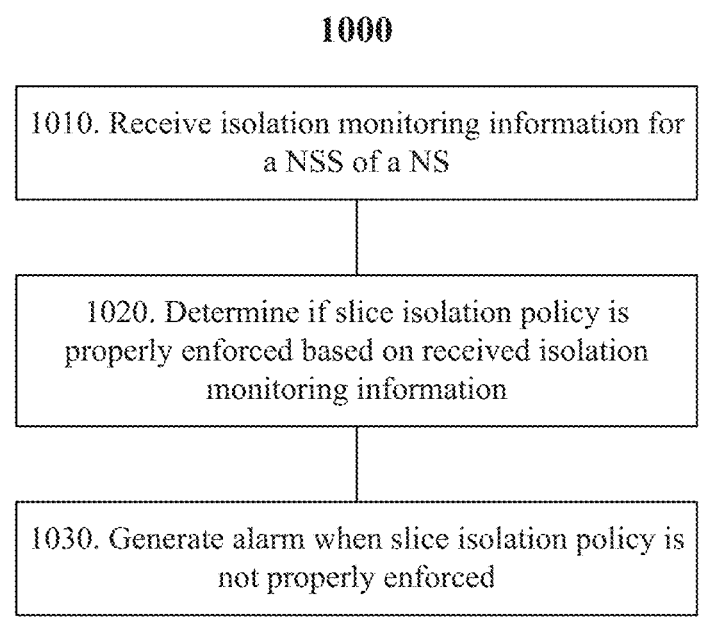
FIG. 11 illustrates a flow chart of a method for monitoring isolation of a network slice in accordance with some example embodiments.

FIG. 11 illustrates a flow chart of a method 1000 for monitoring isolation of a network slice in accordance with some example embodiments. The method 1000 may be performed for example in a network function unit such as the isolation monitoring function 124 shown in FIG. 2.

Referring to FIG. 11, the method 1000 may include a step 1010 of receiving isolation monitoring information for a NSS of a NS, a step 1020 of determining if slice isolation policy is properly enforced during operation of the NSS based on the received isolation monitoring information, and a step 1030 of generating an alarm when it is determined that at least a part of the slice isolation policy is not properly enforced.

For example, during operation of a network slice, the isolation monitoring information for a NSS of the network slice may be received from a domain isolation monitoring function such as the TN isolation monitoring function 134 and/or isolation monitoring functions deployed in the AN and CN domains. In some embodiments, the isolation monitoring information may be received from the domain isolation monitoring function for the NSS periodically or responsive to a request for the isolation monitoring information sent from the isolation monitoring function 124 to the domain isolation monitoring function for the NSS. The received isolation monitoring information may include analysis results of isolation monitoring data with respect to attributes of the network resource isolation policy and the traffic isolation policy refined/extended from the slice isolation policy. Examples of the attributes may include those shown in the above Tables 1-2. Optionally the isolation monitoring information may further include the original isolation monitoring data. The isolation monitoring information received in the step 1010 may include isolation monitoring information for an NSS in an AN domain, isolation monitoring information for a NSS in a TN domain, and isolation monitoring information for a NSS in a CN domain. In the step 1020, the isolation monitoring function 124 determines if slice isolation policy is properly enforced during operation of the NS/NSS based on the received isolation monitoring information. If it is determined that at least a part of the slice isolation policy is not properly enforced, an alarm is generated in the step 1030.

Figure 12:
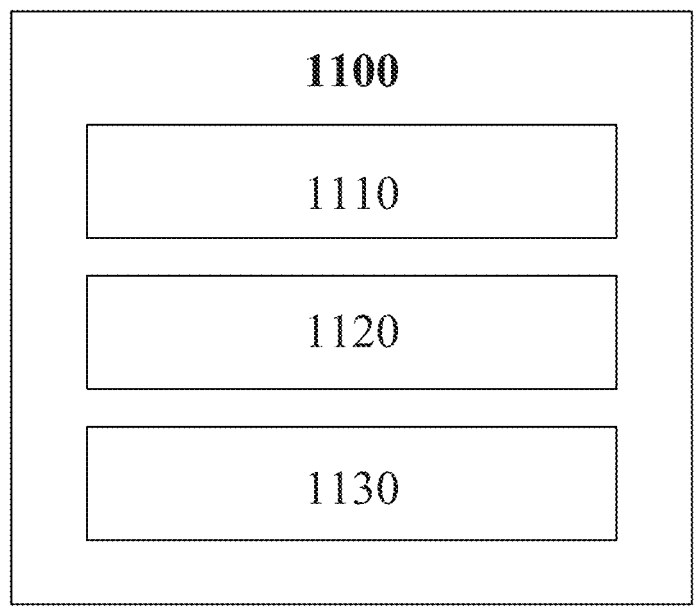
FIG. 12 illustrates a block diagram of an apparatus in accordance with some example embodiments.

FIG. 12 illustrates a block diagram of an apparatus 1100 in accordance with some example embodiments. The apparatus may be implemented for example in the isolation monitoring function 124 to perform the method 1000 shown in FIG. 11. Referring to FIG. 12, the apparatus 1100 may include a first means (or module) 1110 for performing the step 1010 of the method 1000, a second means 1120 for performing the step 1020 of the method 1000, and a third means 1130 for performing the step 1030 of the method 1000.

Figure 13:
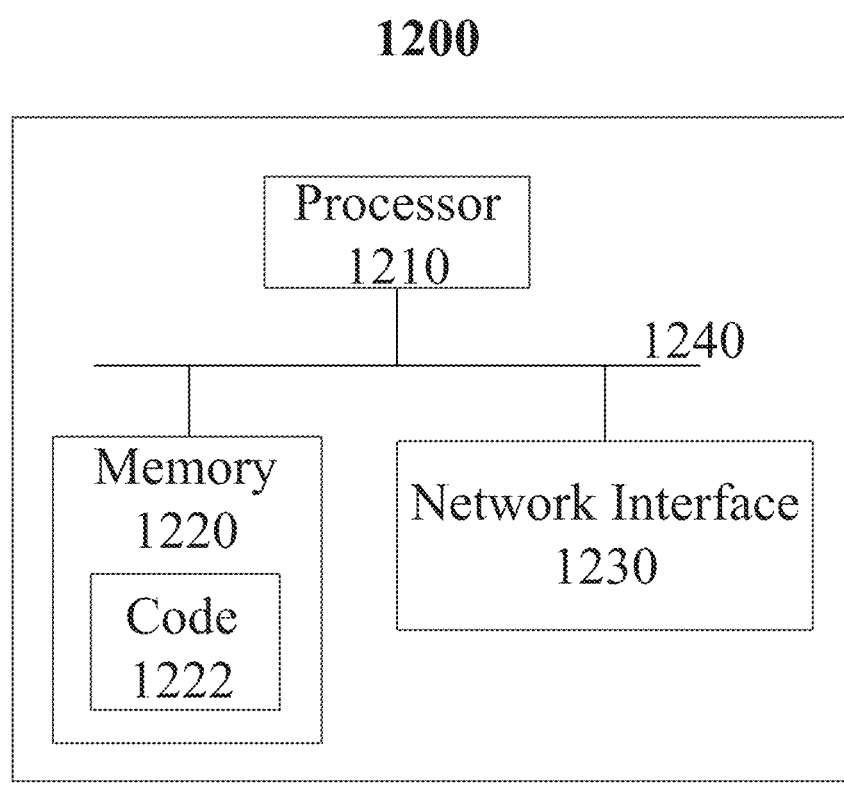
FIG. 13 illustrates a block diagram of a network function unit in accordance with some example embodiments.

FIG. 13 illustrates a block diagram of a network function unit 1200 in accordance with some example embodiments. The network function unit 1200 may be implemented as any one of the network functions discussed above to perform the operations and/or methods relating to the network function. In some embodiments, two or more network functions may be implemented together as the network function unit 1200. For example, the NS isolation management function and the NS isolation monitoring function, or the TN isolation control function and the TN isolation monitoring function, may be implemented together as the network function unit 1200.

Referring to FIG. 13, the network function unit 1200 may include one or more processors 1210, one or more memories 1220 and one or more network interfaces 1230 interconnected together through one or more buses 1240. The one or more buses 1240 may be address, data, or control buses, and may include any interconnection mechanism such as series of lines on a motherboard or integrated circuit, fiber, optics or other optical communication equipment, and the like. The one or more network interfaces 1230 are provided to support wired and/or wireless communications with other network functions, elements or nodes. In some embodiments, the one or more network interfaces 1230 may implement for example NG interfaces or Xn interfaces. The one or more memories 1220 may include computer program code 1222. The one or more memories 1220 and the computer program code 1222 may be configured to, when executed by the one or more processors 1210, cause the network function unit 1200 to perform operations and/or methods as described above.

The one or more processors 1210 may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 1210 may be configured to control other elements of the network function unit and operate in cooperation with them to implement the procedures discussed above.

The one or more memories 1220 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 1220 may include but not limited to an electric, a magnetic, an optical, an electromagnetic, an infrared, or a semiconductor system, apparatus, or device or any combination of the above.

It would be understood that blocks shown in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product embodied in a computer readable medium comprising the computer program code or instructions. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

What is claimed is:

1. A transport network isolation control function apparatus comprising:
   a processor; and
   a memory configured to cause the apparatus to perform the function of:
   receiving slice isolation policy for a network slice subnet (NSS) in a transport network (TN) domain;
   mapping the slice isolation policy to network resource isolation policy and traffic isolation policy;
   mapping the network resource isolation policy and the traffic isolation policy to network resource allocation policy and data traffic forward policy, respectively, wherein the network resource allocation policy and the data traffic forward policy are applied to create the TN NSS;
   checking if the slice isolation policy for the TN NSS has a contradiction with other network slices or NSSs when the slice isolation policy is shared by the TN NSS and the other network slices or NSSs; and
   updating the TN NSS with a new resource allocation policy and a new data traffic forward policy to remove the contradiction;
   the network resource isolation policy includes the following attributes no isolation, physical network function isolation, logical network function isolation, physical network link isolation, and virtual network link isolation,
   wherein:
      the traffic isolation policy comprises attributes including: no isolation, service type isolation, data type isolation, video type isolation, and security protection level isolation,
      the network resource allocation policy comprises attributes including: standard/undifferentiated isolation, dedicated hardware for transport network resources, dedicated software for transport network resources, and logical isolated virtual transport network resources, and
      the data traffic forward policy comprises attributes including: standard/undifferentiated isolation, internet protocol security (IPsec) related rules, access control/filter rules, Differentiated Services Code Point (DSCP) rules, and forward rules in flow table.

* * * * *